United States Patent
Ortega Dona et al.

(10) Patent No.: US 10,041,523 B2
(45) Date of Patent: Aug. 7, 2018

(54) QUICK FASTENING DEVICE FOR PANELS

(71) Applicant: ILLINOIS TOOL WORKS INC., Glenview, IL (US)

(72) Inventors: Raul Ortega Dona, Barcelona (ES); Jaume Arisa Busquets, Barcelona (ES)

(73) Assignee: ILLINOIS TOOL WORKS INC., Glenview, IL (US)

( * ) Notice: Subject to any disclaimer, the term of this patent is extended or adjusted under 35 U.S.C. 154(b) by 0 days.

(21) Appl. No.: 14/395,075

(22) PCT Filed: Apr. 26, 2013

(86) PCT No.: PCT/US2013/038385
§ 371 (c)(1),
(2) Date: Oct. 17, 2014

(87) PCT Pub. No.: WO2013/163528
PCT Pub. Date: Oct. 31, 2013

(65) Prior Publication Data
US 2015/0107060 A1    Apr. 23, 2015

(30) Foreign Application Priority Data
Apr. 27, 2012  (ES) .................................. 201200479

(51) Int. Cl.
*F16B 37/04*    (2006.01)
*F16B 19/10*    (2006.01)
*B60R 13/02*    (2006.01)

(52) U.S. Cl.
CPC ........ *F16B 37/043* (2013.01); *B60R 13/0206* (2013.01); *F16B 19/1081* (2013.01);
(Continued)

(58) Field of Classification Search
CPC .... F16B 37/043; F16B 19/1081; F16B 7/041; B60R 13/0206; B60R 2013/0293;
(Continued)

(56) References Cited

U.S. PATENT DOCUMENTS 4,527,821 A * 7/1985 Tanaka .................... E05C 19/06
                                                       24/297
4,890,966 A   1/1990 Umezawa
(Continued)

FOREIGN PATENT DOCUMENTS

CN    101683837 A    3/2010
FR      2928428 A1   9/2009

OTHER PUBLICATIONS

ISR and WO for PCT/US2013/038385 dated Jul. 19, 2013.

*Primary Examiner* — Abigail E Troy
(74) *Attorney, Agent, or Firm* — Hauptman Ham, LLP

(57) ABSTRACT

A QUICK FASTENING DEVICE FOR PANELS, of the type containing two elements that interact with one another by virtue of the moving parts thereof and which is used to provide an anchoring point for the fastening of an application to the hole in a panel, being formed from a clip and a pin, said clip incorporating tabs descending downwards from the base, and having elastic ability in order to move closer toward the center of said clip through the sliding action of elbows or hooks on said tabs, acting on the inclined profile of cavities provided in said pin.

19 Claims, 3 Drawing Sheets

(52) U.S. Cl.
CPC .... *F16B 37/041* (2013.01); *B60R 2013/0293* (2013.01); *Y10T 24/307* (2015.01)

(58) Field of Classification Search
CPC ..... Y10T 24/307; Y10T 24/30; Y10T 24/303; Y10T 24/304; Y10T 24/309
USPC .................. 24/295, 453, 297, 458, 614–615, 24/293–294; 411/433, 45, 508–510, 340, 411/344, 182, 183, 186, 188, 189, 432, 411/173, 174, 175, 55
See application file for complete search history.

(56) References Cited

U.S. PATENT DOCUMENTS

| | | | |
|---|---|---|---|
| 5,211,519 A * | 5/1993 | Saito | F16B 19/1081 411/45 |
| 6,007,136 A * | 12/1999 | Zittwitz | B60J 3/0221 24/295 |
| 7,226,260 B2 * | 6/2007 | Jackson, Jr. | F16B 21/076 411/112 |
| 2004/0244156 A1 | 12/2004 | Jackson, Jr. et al. | |
| 2006/0066080 A1 | 3/2006 | Ikeda et al. | |
| 2008/0178438 A1 * | 7/2008 | Yoshie | A44B 11/266 24/616 |
| 2011/0072625 A1 * | 3/2011 | Hemingway et al. | 24/457 |

* cited by examiner

QUICK FASTENING DEVICE FOR PANELS

RELATED APPLICATIONS

The present application is a National Phase of International Application Number PCT/US2013/038385 filed Apr. 26, 2013 and claims priority to Spain Application Number P 201200479 filed Apr. 27, 2012.

FIELD OF THE INVENTION

The present invention relates to a quick fastening device for panels, of the type that includes moving parts, which is formed by a clip part interacting with a pin inserted therein and which, by means of action on said moving parts, generates operational fastening of the assembly on the panel, wherein the clip has open-jaw-like downward tabs that the pin closes upon pulling thereon.

BACKGROUND

It is a known prior-art problem to provide, on a surface or a panel, a threaded or non-threaded fastening point for supporting elements that have to be connected thereto. In the type of application targeted by the present invention, one of the most used solutions is to assemble a nut- or clip-type element that, by means of a special tool, is riveted or welded to the panel.

Next, the operator or assembler will have to fit a screw or bolt for fastening the application to be installed on the panel using a further tightening tool.

These operations are repeated in automobile-assembly industries and other manufacturing industries on a multitude of occasions, not only, on one and the same product or vehicle, acting on different parts thereof, but also acting on the successive elements that have to be assembled in the course of a working day. As a consequence, any improvement, however minimal, affecting all or a part of said process has repercussions on overall performance and on manufacturing costs.

That being the case, the present invention relates principally to the improvement of said assembly process by providing a quick fastening device that improves the process of installation on the panel and also later use of the device for supporting an application thereon.

These and other advantages of the present invention will become more apparent in the course of the description thereof.

BRIEF EXPLANATION OF THE INVENTION

The present invention describes a quick fastening device for panels formed by a clip and a pin that, working in cooperation, exhibit properties designed to optimize the performance of the device, such as providing ease of installation not only of the device on the panel but also of the application to be fastened by means of said device, economizing on the use of installation tools and processes, and maintaining or allowing high levels of performance of the installed device, with high extraction force, which holds the installed application stable and secure.

The clip has downward tabs with elastic capability to tend toward the center of the clip. Each of said tabs has, in the form of a curve, elbows or hooks used to guide said tabs in the inclined profile of a cavity provided in the pin.

The clip also has lateral flanges and a central hole with a threaded cylinder or spiral track.

The pin has a base of suitable shape to cover the hole in the installation panel, said base having a central hole for the passage of a screw for fastening the application, and there are two partitions emerging from said base that incorporate said cavity, stops and recesses that interact with other elements provided on the clip to provide the required properties for the device of the invention.

This results in a conveniently installable device, since the same insertion action, which may be a manual action, suffices to position the device in the hole in the panel, by virtue of the fact that all the elements thereof are configured in order to interact and to respond to said insertion thrust into the panel in order to facilitate said process.

Similarly, all the elements of the device interact to provide a simple way in which to dismantle the device from the panel, which gives rise to great ease of installation and removal of the device, thereby meriting the description of "quick" or "easy" in the title of the invention.

Furthermore, paradoxically, however, the device of the invention, once the application to be fastened thereon has been installed, generates high retention forces and great stability for the assembly, the objectives envisaged by the present invention thereby being obtained.

BRIEF EXPLANATION OF THE DRAWINGS

The sheet of drawings, provided purely by way of illustration and which does not limit the invention, is provided to enhance understanding of the invention.

DETAILED EXPLANATION OF THE INVENTION

Figure 1:
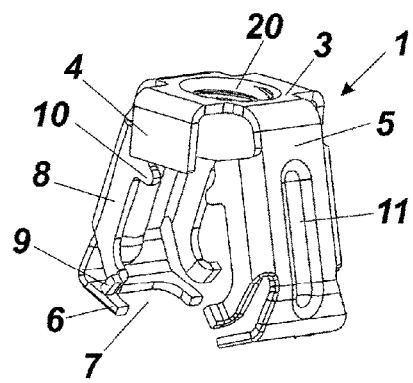
FIG. 1 is a perspective view of the clip part in accordance with the preferred embodiment of a device according to the present invention.
Figure 2:
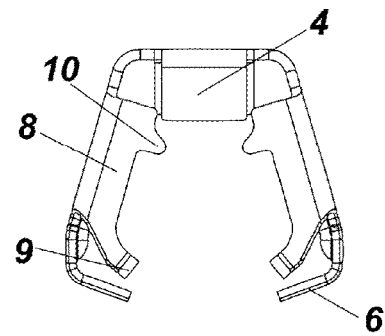
FIG. 2 is a lateral view of the clip of the preceding figure.
Figure 3:
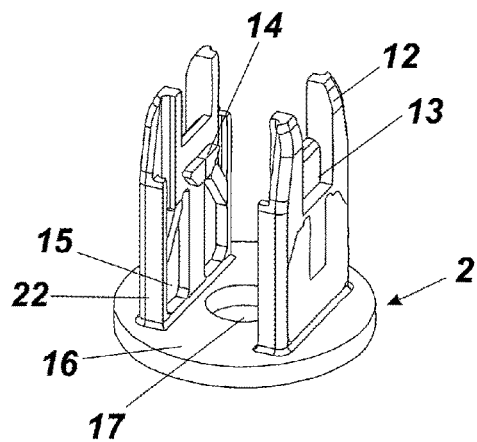
FIG. 3 is a perspective plan view of the pin part in accordance with the preferred embodiment of a device according to the present invention.

The present invention is a quick fastening device for panels of the type containing moving parts, which is formed by a clip part (1) that interacts with a pin (2) inserted in the clip, and by means of action on said moving parts gives rise to the fastening of the assembly, wherein the clip (1) has open-jaw-like downward tabs (5).

In brief, the clip (1) has tabs (5) that project downward from the base (3) thereof, said tabs (5) having a degree of elasticity that enables them to be able to be moved closer toward the center of the clip (1) and released from said tension moving them closer, in order to adopt their normal extended position.

When the clip (1) has been inserted into the hole in a panel, the elbow ends (6) of said tabs (5), formed at said end with a material recess (7), act as a catch against the internal face of the panel and prevent the exit thereof via the hole in said panel.

Flanges (4) and said downward tabs (5) project from the base (3) of said clip (1), which has a central hole with a downward threaded cylinder (20). Said downward tabs have, laterally, lateral folds (8) that are the base for end elbows or hooks (9) and an entrainment projection (10).

In addition, the downward tabs (5) may, as shown in the figures, have structural reinforcement ribs (11).

Furthermore, the pin (2) has a base (16), with a central through-hole (17), from which two vertical formations (22) project in the manner of partitions, which are provided with the elements that, by interacting with the corresponding elements of the clip (1), allow dynamic operation of the device of the present invention.

It should be made clear that, although the graphics illustrating the present description represent said base (16) of said pin (2) as being circular, said base may have any appropriate shape adapted to that of the hole in the panel to be covered, i.e. circular, square, rectangular, etc. Sealing features may optionally also be provided, in accordance with the requirements of the application.

Arranged on said partitions (22) of the pin (2) are stops (14), respective fingers (12) and, provided therebetween, engagement cavities (13). Configured close to the base of said partitions (22) is a cavity (15) that has an inclined profile (18) and an entrainment end (19).

Figure 4:
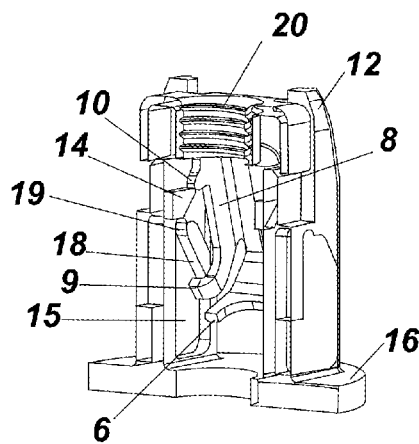
FIG. 4 is a section of a clip/pin assembly of the preceding figures, to facilitate interpretation of how the internal elements thereof interact with one another.

On the basis of the figures accompanying the present invention, it may be seen that FIG. 4 is a section showing details of the mutual relationship of the pin (2) and clip (1) elements described. The elbow or hook (9) of the clip (1) works against the inclined profile (18) of the cavity (15) in the pin (2). The result of this is that if the pin (2) is pulled, the progressive inclination of the pin (2) gives rise to likewise progressive closure of the clip (1) and of the downward tabs (5) thereof, a situation which allows the assembly to pass into the hole in the installation panel.

Figure 5:
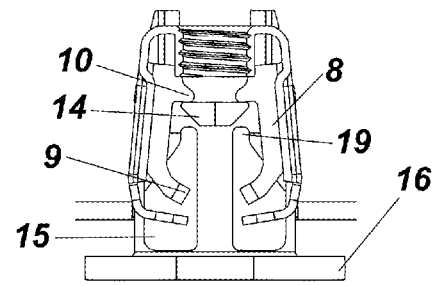
FIG. 5 is a view of a front section of an assembled unit in accordance with the preferred embodiment of the invention, in which said unit is being inserted into the hole in a panel.

When fitting the assembly of the device of the present invention into a hole in a panel, the pin (2), inserted into the clip (1), exerts a thrust by means of the stop (14) thereof against the projection (10) of said lateral folds (8). This insertion action is that shown in FIG. 5 of the graphics accompanying the present invention.

Figure 7:
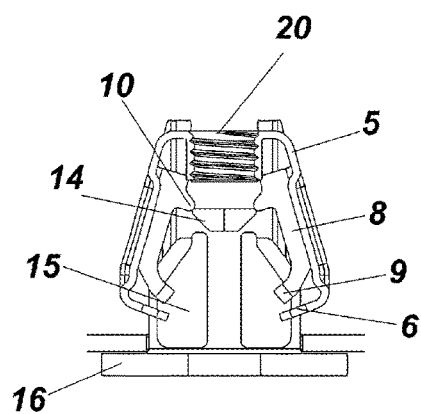
FIG. 7 is a front section view of a device according to the preferred embodiment of the invention, once installed on a panel.
Figure 8:
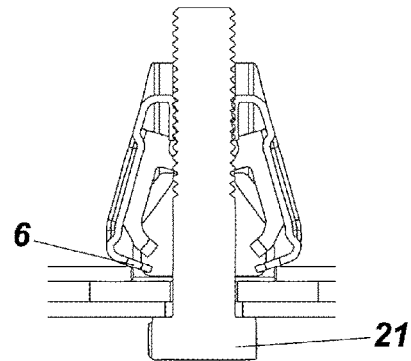
FIG. 8 shows a front section view of the device of the preceding figure in which a screw has been used to fasten an application to a panel. The action of constricting the screw compresses the device against the interior face of the panel, thereby firmly securing the installed application, it being possible to make the join leaktight by means of the pin.

FIG. 7 shows this situation with the device installed in the hole in the panel, but installation of the application to be supported has yet to be achieved. FIG. 8 shows, in simplified form, the installation of said application. A screw (21) is inserted into the device via the hole (17) in the base (16) of the pin (2) until there is engagement with the threaded cylinder (20) arranged in the base (3) of said clip (1). Although it has not been shown, it will be understood that said screw (21) incorporates suitable means, such as a collar, washer, etc., for supporting the application to be fastened, being represented in FIG. 8 by respective support plates located between the panel and the head of said screw (21).

The action of screwing in the screw (21) gives rise, once the application has been drawn fully close to the panel by means of a spindle effect, to the clip descending against the interior face of the panel, thereby firmly securing the device and the application. As explained above, in this situation the elbow ends (6) of said downward tabs (5) act as a catch against the interior face of the panel. Pinching between the exterior elements during fastening of the application and the internal elements of the device of the present invention gives rise to a stable fastening that is highly resistant to removal and in contrast to the ease not only of installation of the device but also of removal thereof.

Figure 6:
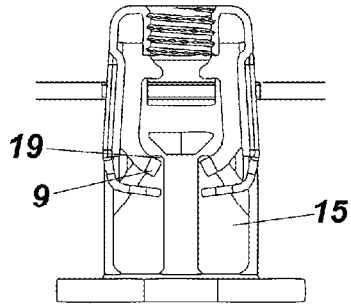
FIG. 6 is a view similar to that of the preceding figure but, on this occasion, the device is being removed from said panel.

FIG. 6 of the graphics accompanying the present description shows the device being removed. Once the screw (21) has been unscrewed and the application removed, it is possible to dismantle the device with the same degree of ease as experienced during installation. When the pin (2) is pulled outward from the panel, exerting a pulling action likewise on the clip (1), said pin (2) slides relative to said clip (1), which entrains the assembly outward from the panel by virtue of said hooks (9), which, on sliding via said inclination (18) of said cavity (15), close the downward tabs (5) of the clip (1), allowing passage via the hole in the panel. The entrainment end (19) of said cavity (15) pulls on the hook (9) and on the clip (1), extracting the device from the hole in the installation panel.

As described above, when the device is fully installed, supporting the application to be fastened, as shown in FIG. 8, a considerable torque is required to fasten the application. The device of the invention is configured to optimize such a situation. The flanges (4) of said clip (1) engage in the cavity (13) provided between the fingers (12) of said pin which surround said flanges (4) and prevent any relative lateral movement between clip (1) and pin (2), thereby stabilizing the assembly.

In the preferred construction thereof shown in the graphics, the clip (1) has been produced from metal and the pin (2) from plastic, dictated by the mechanical properties required of the clip (1) and also the ease of molding the necessary shapes in the pin (2). However, the invention may make use of any material that is appropriate for the intended purpose thereof, not only for the clip (1) but also the pin (2). Furthermore, the invention covers the possibility of producing the pin from a composition of different materials in the base (16) and the vertical partitions (22) thereof, slight variations in the form of said base likewise being envisaged, in certain possible embodiments of the invention, in order to promote the leaktightness of the pin (2) when fastened over the hole in the panel.

Certain possible embodiments of the invention incorporate variations in terms of the elements described that do not change the essential nature of the invention. Instead of a threaded cylinder (20) and a screw (21), for fastening the application, another type of combination may be used, such as, for example, a hole threaded with a single thread and a screw, a bolt and a corresponding engagement hole, etc. The appended claims of the invention describe the various possible embodiments of the invention.

It is understood that in the present case details of finish and form may be varied provided the essential nature of the invention is not modified.

The invention claimed is:

1. A QUICK FASTENING DEVICE, wherein the device is used to provide an anchoring point for the fastening of an application to a hole in a panel, the quick fastening device comprising:
   a clip and
   a pin, said clip incorporating tabs descending downwards from a base of the clip, the tabs having elastic ability in order to move closer toward a center of said clip through sliding action of elbows or hooks on said tabs, wherein the elbows or hooks act on an inclined profile of proximal cavities provided in said, pin, wherein there are stops on partitions of the pin that interact with entrainment projections arranged on lateral folds of said tabs of said clip.

2. THE QUICK FASTENING DEVICE as claimed in claim 1, wherein said clip has flanges projecting downward from the base thereof, said flanges being configured to engage in distal cavities provided in said pin.

3. THE QUICK FASTENING DEVICE as claimed in claim 1, further comprising:
entrainment ends arranged in said cavities of said pin.

4. THE QUICK FASTENING DEVICE as claimed in claim 1, wherein said tabs have elbow ends and a material recess.

5. THE QUICK FASTENING DEVICE as claimed in claim 1, wherein said base of said clip has a central hole with a threaded tube projecting downward therefrom.

6. THE QUICK FASTENING DEVICE as claimed in claim 1, wherein said tabs have structural reinforcement ribs.

7. THE QUICK FASTENING DEVICE as claimed in claim 1, wherein said pin has a base with a sealable central through-hole.

8. THE QUICK FASTENING DEVICE as claimed in claim 1, wherein said clip is made from metal and said pin is made from a plastic material or plastic compound.

9. THE QUICK FASTENING DEVICE as claimed in claim 1 wherein the elbows or hooks of the tabs act as a catch against an internal face of the panel to prevent exit thereof via the hole in the panel.

10. A device for fastening a panel, the device comprising:
a clip; and
a pin configured to engage with the clip such that when the pin is mounted into the clip the clip is closeable around the pin, and wherein the device is configured such that when the pin is inserted into the clip, a thrust is exerted by means of a stop on the pin against a projection of lateral folds on the clip.

11. The device of claim 10, further comprising:
a tab extending from the clip, and
an elbow or hook on the tab that interacts with a cavity in the pin.

12. The device of claim 11, further comprising:
an orifice in the pin vertically aligned with a threaded cylinder in the clip.

13. The device of claim 12, further comprising:
a screw configured to be inserted into the device via the orifice in the pin to engage with the threaded cylinder.

14. The device of claim 13 wherein rotation of the screw within the threaded cylinder causes the tab to bend toward a center of the clip.

15. The device of claim 10 wherein progressive inclination of the pin causes proportionate closure of the clip and a tab upon pulling of the pin.

16. The device of claim 10 wherein the clip and the pin combine to form a male-to-female connection such that a vertical formation of the pin engages with a tab.

17. The device of claim 10, further comprising:
flanges projecting downward from a base, wherein the flanges engage with cavities of the pin.

18. A quick fastening device, comprising:
a clip and
a pin, wherein
the device is configured to provide an anchoring point for the fastening of an application to a hole in a panel,
the clip includes a base and two arms extending from the base, the clip being configured such that the arms are elastically movable towards a longitudinal axis of the clip relative to the base,
the device is configured such that when the pin is pulled away from the clip, interaction between the arms and the pin drive the arms towards the longitudinal axis of the clip, thereby locking the clip to the pin, and
components on the arms act on inclined profiles of cavities in the pin to drive the arms toward the longitudinal axis.

19. The device of claim 18, wherein:
the pin includes fingers that extend about the base and beyond the base, relative to a portion of the base facing the arms, when the pin is pulled away from the clip such that the arms are driven towards the longitudinal axis, thereby centering the clip relative to the pin.

* * * * *